UNITED STATES PATENT OFFICE.

WILLIAM R. ALBERTSON, OF WORCESTER, AND NATHANIEL B. BRIGGS, OF ROCKLAND, MASSACHUSETTS; SAID BRIGGS ASSIGNOR TO SAID ALBERTSON.

COLORING AND BURNISHING COMPOSITION.

SPECIFICATION forming part of Letters Patent No. 501,312, dated July 11, 1893.

Application filed April 17, 1893. Serial No. 470,697. (No specimens.)

*To all whom it may concern:*

Be it known that we, WILLIAM R. ALBERTSON, residing at Worcester, in the county of Worcester, and NATHANIEL B. BRIGGS, residing at Rockland, in the county of Plymouth, State of Massachusetts, both citizens of the United States, have invented a new and useful Coloring and Burnishing Composition for Boots and Shoes, of which the following, is a specification sufficiently full, clear, and exact to enable persons skilled in the art to which this invention appertains to make and use the same.

The object of our present invention is to provide a coloring and burnishing composition to be used upon the soles, heels, edges and other parts of boots and shoes for finishing the same in such suitable color as desired, and which when dried upon the leather and acted upon by the burnishing tools or appliances, will afford a fine finish and luster; work easily and smoothly under the tools, and which shall be of a neutral nature and applicable upon various styles of shoes or classes of stock with practical economy and successful results.

Our invention consists in the improved composition which we now proceed to describe.

This improved coloring and burnishing composition comprises the following elements in combination, preferably in about the proportions named, viz: fourteen ounces of any neutral soap, and six and one-fourth pounds of carnauba wax (or other suitable wax) cut therein, forming an emulsion; three and one-fourth pounds of gum senegal or other suitable gum soluble in water; twenty five ounces of neutral solution of fish glue (*i. e.* fish glue dissolved in water in ratio of about one pound of glue to one gallon of water); two and one-half pounds of dextrine; three and three-fourths pounds of non-acid aniline of any desired color; water, a sufficient quantity with the above making ten gallons of mixture; the same being neither alkaline nor acid in its nature, but entirely neutral as a liquid mass, of convenient fluidity to be easily and uniformly flowed or spread by a brush or sponge over the surfaces upon which it is used, and which readily dries thereon.

In compounding the ingredients the preferable practice is to first liquefy the soap and wax emulsion in a suitable container by application of heat, then add thereto the other ingredients thoroughly incorporating the same by mechanical agitation or stirring while in heated condition. This produces a composition that works easily under the burnishing tool whether heated by flame, steam or friction, and obviates all creaking or sticking of the tools used for finishing the surfaces.

The composition presents no alkali to cause the finished work to change color or become gray by exposure, and no acid liable to injure the upper leather of fine goods or the fine colors originally in the upper leather fabrics; thus making it very desirable for use on fine or fancy shoes.

By adding to the above mixture twenty three ounces of borax dissolved in about one gallon of water, and substituting gum shellac in place of the gum senegal above named, we make a somewhat alkaline compound of the same which may, for some classes of work, be preferred; as for instance, on light colors as red, yellow or buff shoes. This alkaline form of the compound is designed more especially for use on those goods which are in light colors, or on goods made from stock in which the leather itself is so strongly impregnated with an acid that it would be liable to change the composition when applied thereto; the mixture being thus enabled to counteract the acidity at the surface of the stock, leaving a finally neutral result in the finish.

We claim—

1. The improved coloring and burnishing composition comprising an emulsion of soap and carnauba-wax, a soluble gum or adhesive ingredient, and coloring matter, compounded in a liquid mixture that is neither acid nor alkaline in character, as set forth.

2. The improved burnishing compound comprising an emulsion of soap with carnauba or other suitable wax, a neutral solution of fish glue, gum senegal, dextrine and coloring matter, as set forth.

3. The coloring and burnishing compound hereinbefore described, comprising an emulsion of soap and carnauba or other wax, a neutral solution of glue and dextrine, an alkaline mixture of gum, borax and coloring matter, as described.

Witness our hands this 11th day of April, A. D. 1893.

WILLIAM R. ALBERTSON.
NATHANIEL B. BRIGGS.

Witnesses:
CHAS. H. BURLEIGH,
ELLA P. BLENUS.